United States Patent [19]

Ferrari

[11] Patent Number: 5,255,979
[45] Date of Patent: Oct. 26, 1993

[54] MEDICAL TEMPERATURE PROBE COVER

[76] Inventor: R. Keith Ferrari, 6525 Radcliff Dr., Nashville, Tenn. 37221

[21] Appl. No.: 11,910

[22] Filed: Feb. 1, 1993

[51] Int. Cl.⁵ .......................... G01K 1/08; G01K 1/14; B65D 85/38
[52] U.S. Cl. ..................................... 374/158; 374/209; 206/306; 206/484.2; 206/813; 128/736
[58] Field of Search ................ 374/158, 209; 206/306, 206/305, 484.2, 813; 128/736

[56] References Cited

U.S. PATENT DOCUMENTS

| | | | |
|---|---|---|---|
| 3,809,230 | 5/1974 | Poncy | 206/306 |
| 4,142,631 | 3/1979 | Brandriff | 206/306 |
| 4,164,285 | 8/1979 | Dorman | 206/306 |
| 4,165,000 | 8/1979 | Poncy | 206/306 |
| 4,241,828 | 12/1980 | Bourdelle et al. | 206/306 |
| 4,654,145 | 3/1987 | Bjornberg | 374/158 |
| 4,684,018 | 8/1987 | Jarund | 374/158 |

FOREIGN PATENT DOCUMENTS

| | | | |
|---|---|---|---|
| 0023675 | 7/1971 | Japan | 374/158 |
| 0303009 | 8/1968 | U.S.S.R. | 374/158 |

Primary Examiner—William A. Cuchlinski, Jr.
Assistant Examiner—Diego F. F. Gutierrez
Attorney, Agent, or Firm—Vernon J. Pillote

[57] ABSTRACT

A temperature probe cover for adhesively mounting a medical temperature probe on a body comprising a moisture barrier sheet having an aperture means adapted to allow at least a portion of the head of a temperature sensing probe to be inserted therethrough, a layer of skin compatible hydrogel adhesive on the side of the moisture barrier sheet to be oriented toward the body, a water absorbent sheet having a layer of water inactivatable pressure sensitive adhesive on the side oriented toward the moisture barrier sheet, a release sheet overlying at least a portion of said moisture barrier sheet and having a release agent facing said water inactivatable pressure sensitive adhesive to facilitate moving the water absorbent sheet away from the moisture barrier sheet when mounting a temperature probe between the water absorbent sheet and the second side of the moisture barrier sheet. The water inactivatable pressure sensitive adhesive, upon removal of the release sheet, is adapted to adhere to the moisture barrier sheet and to a temperature probe therebetween and the water inactivatable pressure sensitive adhesive being adapted to detackify when the water absorbent sheet is saturated with water to facilitate removal of the temperature probe.

12 Claims, 2 Drawing Sheets

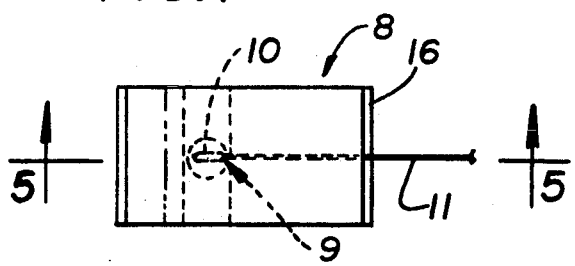
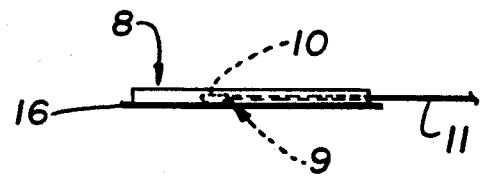
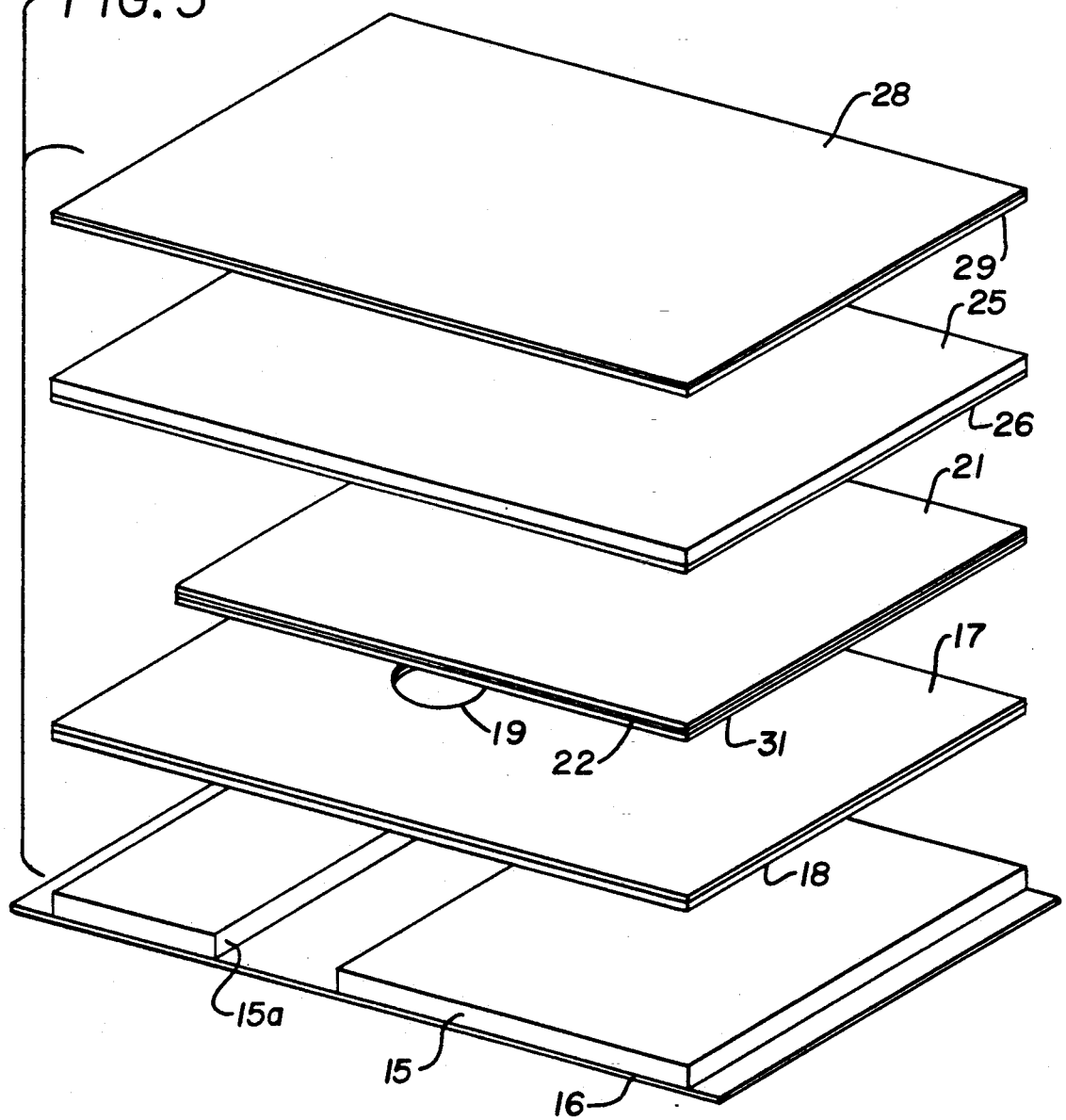

MEDICAL TEMPERATURE PROBE COVER

BACKGROUND OF THE INVENTION

In the care and treatment of some patients, it is sometimes necessary to monitor body temperature for extended periods of time and in the care of neonatal and premature infants, to control external heating as by radiant heaters in order to maintain a desired body temperature. It is common practice to attach the temperature sensing probe directly to the patient's body with a temperature probe cover that adhesively secures the temperature probe to the body and also thermally insulates the temperature probe from the ambient air and heat radiation so that the temperature probe can accurately respond to the temperature of the body. Although the temperature probe is relatively small in size, it can create an irritating pressure point when pressed against the body of the patient with an adhesive patch or cover pad for an extended period of time. Skin compatible acrylic adhesives are effective in anchoring the temperature sensors to the skin. However, such adhesives are very aggressive in terms of the degree of adhesion to the skin and can be disruptive of the frail skin of some patients such as neonatals and premature infants when removing the thermistor cover from the infant. Applicant has made temperature probe covers using hydrogel adhesive to attach the temperature probe cover to the skin. The hydrogel adhesive reduces laceration of the skin from that encountered with acrylic adhesives and also reduces the skin pressure point problem because the hydrogel can partially conform to the contour of the upper side of the temperature probe. Further, hydrogel adhesive facilitates removal and repositioning of the temperature probe cover on different portions of the patients body, as is frequently necessary when changing the position of the patient or when taking X-rays. However, hydrogel adhesives are not as effective as acrylic adhesives in anchoring the temperature probe to the skin and it has been found that tension on the probe lead wires, such as can occur when the patient moves or is moved to different positions, sometimes causes the temperature probe to be pulled completely out from between the temperature probe cover and the skin.

Some patients including neonatals and premature infants, sometimes require temperature monitoring and/or controlled heating for extended periods of several weeks or longer, and it is desirable to be able to replace the temperature probe covers and reuse the temperature probes one or more times on the patient.

SUMMARY OF THE INVENTION

It is an object of the present invention to overcome the problems of the prior art temperature probe covers by providing a temperature probe cover that minimizes the skin pressure point caused by the temperature probe when it is mounted on the patient's body; which reduces disruption of skin integrity when removing the temperature sensing probe from contact with the skin and which firmly anchors the temperature probe to the patient.

Another object of this invention is to provide a temperature probe cover which can be easily removed from the temperature sensing probe to enable replacement of the temperature probe cover and reuse of the temperature probe.

Accordingly, the present invention provides a temperature probe cover for adhesively mounting a temperature probe on a body and which has a moisture barrier sheet and aperture means in the barrier sheet means to allow at least a portion of the head of a temperature sensing probe to pass therethrough, a layer of skin compatible hydrogel adhesive on the side of the moisture barrier sheet adapted to be oriented toward the body, and a water absorbent sheet having a layer of water inactivatable pressure sensitive adhesive on the side oriented toward the moisture barrier sheet. The water inactivatable pressure sensitive adhesive is adapted to adhere to the moisture barrier sheet and to a temperature probe and lead wires therebetween, to firmly anchor the temperature probe to the temperature probe cover, and the water inactivatable pressure sensitive adhesive is adapted to detackify when the water absorbent sheet is saturated with water to facilitate removal of the temperature probe.

The temperature probe cover advantageously includes a release sheet that underlies the water inactivatable pressure sensitive adhesive to facilitate moving the water absorbent sheet away from the moisture barrier sheet when mounting a temperature probe in the cover, the release sheet being removable to allow the water inactivatable pressure sensitive adhesive to adhere to the moisture barrier sheet and temperature probe therebetween.

BRIEF DESCRIPTION OF THE DRAWINGS

FIG. 1 is a plan view of a temperature probe and cover assembly embodying the present invention, illustrating the same substantially full size;

FIG. 2 is a side elevational view of the temperature probe and cover assembly of FIG. 1;

FIG. 3 is an exploded view on an enlarged scale of the temperature probe cover assembly;

DETAILED DESCRIPTION

The present invention relates to a temperature probe cover assembly 8 for adhesively mounting a medical temperature probe 9 on a patient's body, for monitoring the temperature of the body and for controlling external heat when necessary to maintain a desired body temperature. Such medical temperature probes comprise a temperature sensing head portion 10 and leads 11 which extend to a remote monitoring and control apparatus (not shown), which not only gives a continuous temperature readout but also controls heat sources such as radiation lamps to heat the infant as required to maintain a desired body temperature. The temperature probes are preferably of the thermistor type, the resistance of which varies with temperature, and the thermistors are coated or encapsulated in a thermally conductive electrically-insulative cover. Such medical temperature probes are commercially available, for example from Alpha Thermistor, Inc. of San Diego, Calif. and Thermometrics, Inc. Edison, N.J.

Figure 4:
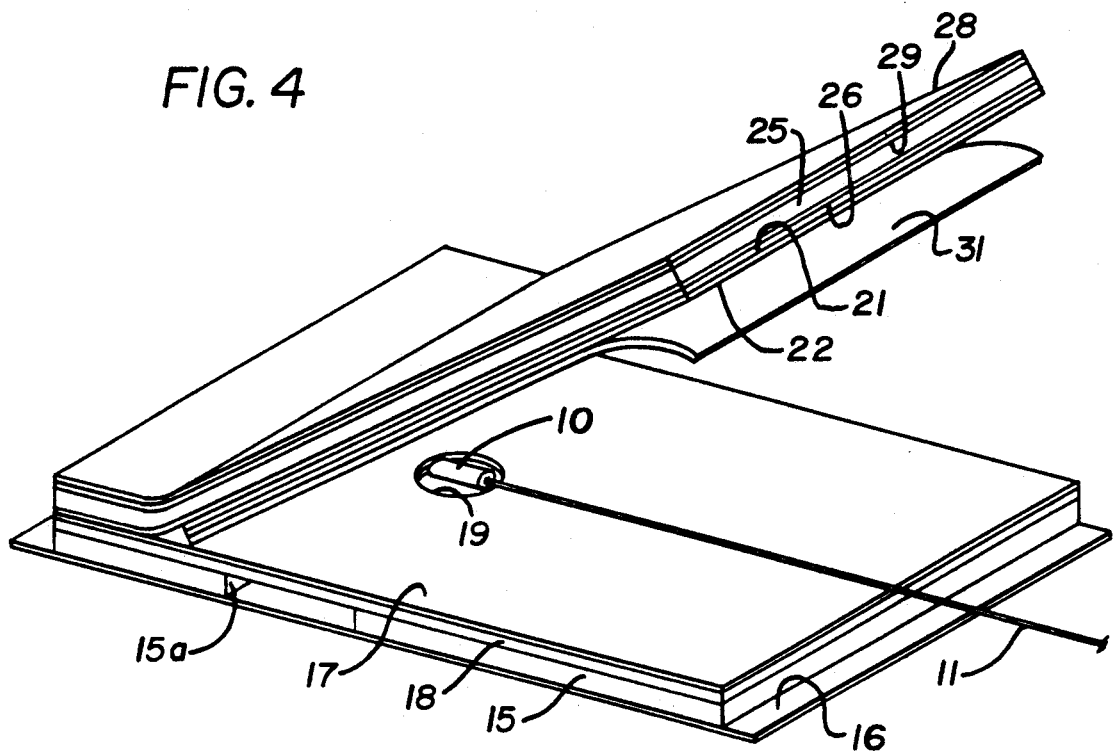
FIG. 4 is a perspective view on an enlarged scale illustrating assembly of a temperature sensing probe in the temperature probe cover.
Figure 7:
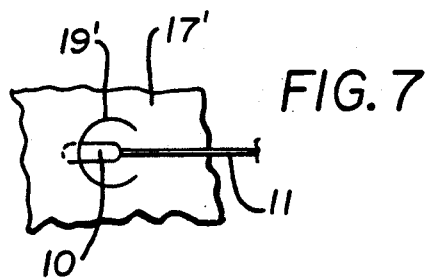
FIG. 7 is a fragmentary view illustrating mounting of the temperature probe in the modified cover assembly of FIG. 6.
Figure 5:
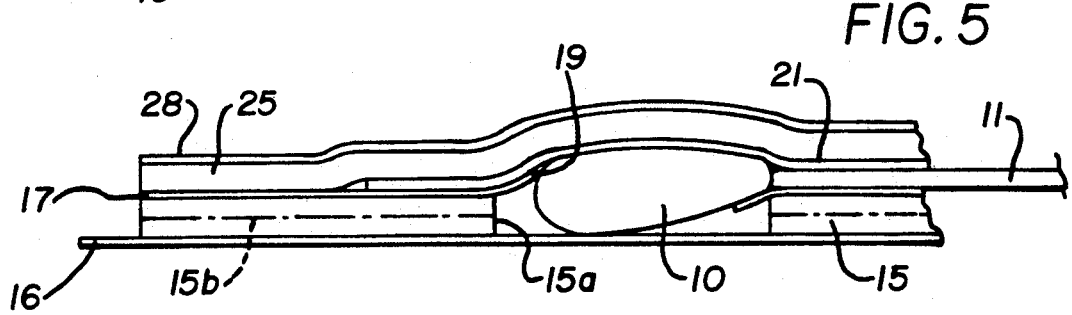
FIG. 5 is a fragmentary sectional view taken on the plane 5—5 of FIG. 1 and illustrating parts on an enlarged scale.
Figure 6:
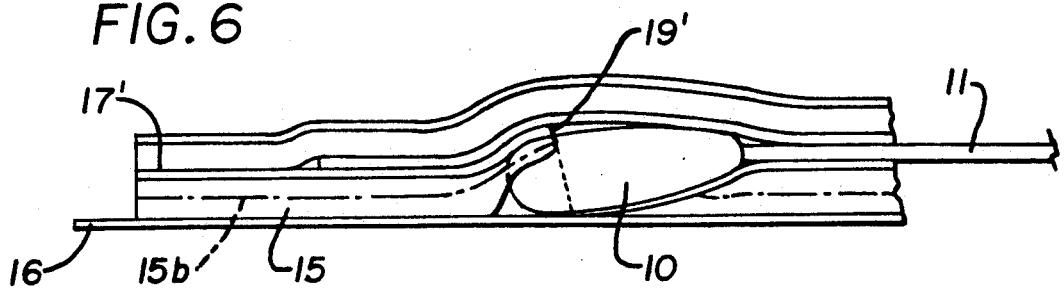
FIG. 6 is a fragmentary sectional view illustrating a modified form of temperature probe cover assembly.

The temperature probe covers of the present invention are adapted to be mounted on an infant's body by a layer of skin compatible hydrogel adhesive 15. Hydrogel adhesives adapted for use in medical applications are commercially produced by Promeon, a division of Medtronic, Inc. (Brooklyn Center, Minn.) and Lectec Corp.(Eden Prairie, Minn.). As shown, a removable base sheet 16 underlies the lower side of the layer of hydrogel adhesive, that is the side that is adapted to be oriented toward the body. A moisture barrier sheet 17 overlies the upper side of the layer of hydrogel 15 and preferably has a layer of adhesive 18 such as acrylic adhesive, on its underside to enhance adhesion of the moisture barrier sheet to the layer of hydrogel adhesive. Aperture means 19 are provided in the moisture barrier sheet inwardly of the periphery of the sheet, and the aperture means is arranged to allow at least a tip portion of the temperature sensing head to be inserted downwardly therethrough as shown in FIGS. 4 and 5. The layer of hydrogel adhesive usually has an open mesh reinforcing scrim indicated at 15b in FIGS. 5 and 6, intermediate the upper and lower surfaces which would impede pressing the probe head 10 therethrough to contact the infant's skin. In the embodiment of FIGS. 1-5, the layer of hydrogel is removed in an area below the aperture means to allow the probe head to contact the skin. For convenience in production, the layer of hydrogel can be removed in a strip that extends across the aperture means 19, as indicated at 15a in FIGS. 1, 4 and 5. The embodiment of FIGS. 6 and 7 is the same as FIGS. 1-5 and like numerals are used to designate the same parts and the postscript ' used to designate modified parts. In the embodiment of FIGS. 6 and 7, the aperture means 19' is in the form of a cut that is arcuate or U-shaped as viewed in the plane of the moisture barrier sheet and which extends through the moisture barrier sheet 17' and through the layer of hydrogel adhesive and the reinforcing scrim 15b, so that the tip of the head portion 10 of the probe can be inserted through the cut 19' and below the scrim 15b as shown in FIG. 6 to contact the skin of the patient. The adhesive layers 18, 22, 26 and 29 are very thin and are not shown in FIGS. 5 and 6 to simplify the drawing.

A cover sheet 21 having a layer of adhesive 22 on its underside is arranged to adhere to the upper side of the moisture barrier sheet 17 and to the head 10 and lead wires 11 of the temperature probe to anchor the temperature probe in the cover. In order to facilitate reuse of the temperature sensor with a replacement temperature probe cover, the adhesive 22 is advantageously a water inactivatable pressure sensitive adhesive of a type which loses adhesion to a substrate when contacted with excess amounts of water, and the cover 21 is a water absorbing sheet to facilitate distribution of moisture to the water inactivatable adhesive 22. The water inactivatable pressure sensitive adhesive is preferably of the type disclosed in U. S. Pat. No. 5,032,637, the disclosure of which is incorporated herein by reference. As disclosed in that patent, the water inactivatable pressure sensitive adhesive comprises a hydrophilic base polymer component in admixture with a water soluble tackifying agent for the base polymer. Such a water inactivatable pressure sensitive adhesive is marketed by Adhesives Research, Inc., Glenn Rock, Pa. under the designation AR 7810. The cover sheet 21 is of material having the capability of absorbing excess or saturating amounts of moisture, with such amounts being on the order of 25 percent or more based on the weight of the adhesive, and adapted to promote distribution of moisture across the adhesive layer 22 by a wicking effect. It is also desirable that the cover material be one to which the pressure sensitive adhesive can be well bonded to ensure that, upon contact of excess amounts of moisture with the adhesive, any delamination or phase separation which occurs, will occur at the interface between the adhesive layer and the substrate. The cover sheet 21 can be of non-woven or woven material and of natural or synthetic fibers and may, for example be a non-woven polyester such as Dupont Sontara or a woven cellulose acetate tricot.

In order to thermally insulate the temperature sensing probe from the ambient air and heat radiation sources, a layer 25 of flexible thermal insulating material, such as foamed plastic is adhered by a layer of adhesive 26 to the cover sheet 21, and a flexible radiation reflective sheet 28 is adhered by an adhesive layer 29 to the upper side of the thermal insulating sheet 25. For example, the thermal insulating material may for example comprise foamed closed cell cross linked polyethylene preferably having a thickness of the order of 0.8 mm or more. Such foamed polyethlene sheet material is commercially available from Valtic Corporation, Plainview, N.Y. The radiation reflective sheet 28 may comprise a metallized polyester sheet. The adhesive layers 18, 26 and 29 are preferably hydrophobic and may, for example comprise an acrylic adhesive.

The cover sheet 21, thermal insulating sheet 25 and reflective sheet 28 could be formed as a sub-assembly for attachment to the upper side of the moisture barrier sheet 17, after the temperature probe is assembled by inserting the head portion through the opening means 19. However, this would require care in positioning of the sub-assembly including the cover sheet relative to the moisture barrier sheet. In order to facilitate assembly, provision is made for hingedly mounting the cover sheet on the vapor barrier sheet, with a release sheet 31 underlying at least a major portion of the adhesive layer 22. In the embodiment illustrated, the cover sheet 21 and the adhesive layer 22 are trimmed off or shortened along one edge so that one portion of the thermal insulating sheet 25 overlies and is adhered to the cover sheet 21 while the remaining portion of the thermal insulating sheet is adhered to the upper side of the moisture barrier sheet 21. Alternatively, the cover sheet 21 could be adhered by the adhesive 22 to the moisture barrier sheet 17 with the release sheet 31 arranged to underlie only a portion of the adhesive on the cover sheet so that the cover sheet could be lifted as shown in FIG. 4. After positioning the head portion 10 of the temperature sensing probe in the aperture means 19, with the leads 11 extending across the upper side of the moisture barrier sheet, the release sheet 31 can be removed. The cover sheet 21 together with the thermal insulating sheet 25 and radiation reflective sheet 28 can then be pressed down so that the water inactivatable adhesive 22 adheres to the moisture barrier sheet and to the temperature sensing probe including the head and lead, to firmly adhere the temperature sensing probe in the cover.

The hydrogel adhesive 15 allows the probe and probe cover to be removed from the body of the patient and repositioned, for example when it is desired to change the side of the patient to which the probe is attached when the patient is turned or for bathing of the patient. The temperature sensing probe can be easily removed from the probe cover for reuse in a new temperature probe cover, by saturating the water absorbent sheet with water. This can conveniently be achieved by removing the probe and cover assembly from the body of the patient and then dipping the probe and cover assembly in water. The water inactivatable adhesive detackifies in a short time and allows the cover sheet to be separated from the moisture barrier sheet so that the temperature probe and leads can be removed.

The head portion of thermistor type temperature sensing probes is quite small, commonly of the order of about two millimeters in cross section and four to six millimeters in length. The layer 15 of hydrogel adhesive preferably has a thickness of the order of 0.8 millimeters or more and substantially reduces the skin pressure point produced by the temperature sensing probe. The probe is adhesively secured between the moisture barrier sheet 17 and the cover sheet 21 so that tension on the leads 11 will not pull the probe out of the cover assembly. The moisture barrier sheet 17 prevents moisture in the hydrogel adhesive 15 from migrating into the water-inactivatable adhesive during normal use. However, the probe can be readily removed from the cover assembly for reuse by saturating the cover member with water.

The embodiments of the invention in which an exclusive property or privilege is claimed are defined as follows:

1. A temperature probe cover for adhesively mounting a medical temperature probe on a body, the temperature probe having a temperature sensing head and insulated leads, the probe cover comprising:
   a) a moisture barrier sheet having first and second sides and first aperture means for allowing at least a potion of the head of a temperature sensing probe to be inserted therethrough,
   b) a layer of skin compatible hydrogel adhesive on the first side of the moisture barrier sheet, the first side of the moisture barrier sheet being oriented toward the body, said hydrogel adhesive layer having second aperture means in alignment with the first aperture means for allowing said at least a portion at the head of the temperature sensing probe to contact the body,
   c) a water absorbent sheet having first and second sides,
   d) a layer of water inactivatable pressure sensitive adhesive on the first side of the water absorbent sheet oriented toward the second side of the moisture barrier sheet,
   e) a release sheet overlying at least a portion of said moisture barrier sheet and having a release agent facing said water inactivatable pressure sensitive adhesive to facilitate moving the water absorbent sheet away from the moisture barrier sheet when mounting a temperature probe between the water absorbent sheet and the second side of the moisture barrier sheet, wherein the water inactivatable pressure sensitive adhesive, upon removal of the release sheet, adheres to the second side of the moisture barrier sheet and to a temperature probe therebetween, and the water inactivatable pressure sensitive adhesive detackifies when the water absorbent sheet is saturated with water to facilitate removal of the temperature probe.

2. A medical temperature probe cover according to claim 1 wherein said release sheet overlies only a portion of the moisture barrier sheet in a zone extending from the aperture means to an edge of the moisture barrier sheet.

3. A medical temperature probe cover according to claim 1 wherein said water absorbent sheet overlies only a first portion of the second side of said moisture barrier sheet in a first zone extending from the aperture means to an edge of the moisture barrier sheet, and further comprising thermal insulating sheet means adhered to a second side of said water absorbent sheet means and a second portion of the second side of the moisture barrier sheet.

4. A medical temperature probe cover according to claim 1 including thermal insulating means adhered to a second side of the water absorbent sheet.

5. A medical temperature probe cover according to claim 4 wherein said thermal insulating means includes a sheet of flexible foamed plastic material.

6. A medical temperature probe cover means according to claim 5 wherein said thermal insulating means includes a sheet of thermal radiation reflective material adhered to the sheet of flexible foamed plastic material.

7. A medical temperature probe cover means according to claim 1 wherein said water inactivatable pressure sensitive adhesive is comprised of a hydrophillic base polymer component in admixture with at least one water soluble tackifying agent for the base polymer.

8. A medical temperature probe and cover assembly for adhesive mounting on a body comprising:
   a) a temperature probe having temperature sensing head and insulated leads,
   b) a moisture barrier sheet having first and second sides and first aperture means for allowing at least a portion of the head of the temperature sensing probe to pass therethrough, the leads extending from the first aperture means across the second side of the moisture barrier sheet at least to an edge of the latter,
   c) a layer of skin compatible hydrogel adhesive on the first side of the moisture barrier sheet, the first side of the moisture barrier sheet being oriented toward the body, said hydrogel adhesive layer having second aperture means in alignment with the first aperture means for allowing said at least a portion at the head of the temperature sensing probe to contact the body,
   d) a water absorbent sheet having first and second sides,
   e) a layer of water inactivatable pressure sensitive adhesive on the first side of the water absorbent sheet oriented toward the second side of the moisture barrier sheet, wherein the water inactivatable pressure sensitive adhesive adheres to the second side of the moisture barrier sheet and to the temperature probe therebetween, and the water inactivatable pressure sensitive adhesive detackifies when the water absorbent sheet is saturated with water to facilitate removal of the temperature probe.

9. A medical temperature probe cover according to claim 8 including thermal insulating means adhered to the second side of the water absorbent sheet.

10. A medical temperature probe cover according to claim 9 wherein said thermal insulating means includes a sheet of flexible foamed plastic material.

11. A medical temperature probe cover means according to claim 10 wherein said thermal insulating means includes a sheet of thermal radiation reflective material adhered to the sheet of flexible foamed plastic material.

12. A medical temperature probe cover means according to claim 8 wherein said water inactivatable pressure sensitive adhesive is comprised of a hydrophillic base polymer component in admixture with at least one water soluble tackifying agent for the base polymer.

* * * * *

UNITED STATES PATENT AND TRADEMARK OFFICE
CERTIFICATE OF CORRECTION

PATENT NO. : 5,255,979
DATED      : Oct. 26, 1993
INVENTOR(S): R. Keith Ferrari

It is certified that error appears in the above-identified patent and that said Letters Patent is hereby corrected as shown below:

Claim 1, column 5, line 42, delete "at" and insert -- of --.

Claim 8, column 6, line 39, delete "at" and insert -- of --.

Signed and Sealed this

Third Day of May, 1994

Attest:

BRUCE LEHMAN

Attesting Officer

Commissioner of Patents and Trademarks